United States Patent
Goto et al.

(10) Patent No.: US 12,115,957 B2
(45) Date of Patent: Oct. 15, 2024

(54) CONTROL APPARATUS

(71) Applicant: Hitachi Astemo, Ltd., Ibaraki (JP)

(72) Inventors: Daisuke Goto, Hitachinaka (JP); Haruhiko Fujita, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 400 days.

(21) Appl. No.: 17/435,797

(22) PCT Filed: Mar. 9, 2020

(86) PCT No.: PCT/JP2020/009961
§ 371 (c)(1),
(2) Date: Sep. 2, 2021

(87) PCT Pub. No.: WO2020/217740
PCT Pub. Date: Oct. 29, 2020

(65) Prior Publication Data
US 2022/0144237 A1     May 12, 2022

(30) Foreign Application Priority Data

Apr. 22, 2019 (JP) .................................. 2019-080965

(51) Int. Cl.
*B60T 8/175* (2006.01)
*B60T 17/22* (2006.01)

(52) U.S. Cl.
CPC ............. *B60T 17/22* (2013.01); *B60T 8/175* (2013.01)

(58) Field of Classification Search
CPC ........ B60T 13/741; B60T 7/042; B60T 17/22; B60T 2270/40; B60T 13/74; B60T 8/175; H01F 7/18
See application file for complete search history.

(56) References Cited

U.S. PATENT DOCUMENTS 3,989,990 A * 11/1976 Thompson ................ B60L 7/10
   318/532
4,339,984 A * 7/1982 Huhne ................. G05B 19/231
   901/22

(Continued)

FOREIGN PATENT DOCUMENTS

CN     111699119 B  *  2/2023  ............. B60T 1/065
DE     4213001 A1   * 10/1992

(Continued)

OTHER PUBLICATIONS

International Search Report issued Apr. 7, 2020 in corresponding International Application No. PCT/JP2020/009961, with English translation.

(Continued)

*Primary Examiner* — Khoi H Tran
*Assistant Examiner* — Jorge O Peche
(74) *Attorney, Agent, or Firm* — Wenderoth, Lind & Ponack, L.L.P.

(57) ABSTRACT

A rear electric brake electronic control unit (ECU) includes a delay circuit between a microcomputer of the rear electric brake ECU and a switch for driving a solenoid of a parking mechanism. The delay circuit is configured to delay a signal for driving the switch. The rear electric brake ECU further includes a diagnosis circuit for diagnosing an actuation state of the microcomputer. The diagnosis circuit is able to shut off a power supply to the solenoid regardless of a state of a signal of the solenoid if the actuation state of the microcomputer is abnormal.

7 Claims, 5 Drawing Sheets

(56) References Cited

U.S. PATENT DOCUMENTS

| | | | | |
|---|---|---|---|---|
| RE31,337 E | * | 8/1983 | Stearns | B60T 13/265 303/7 |
| 4,399,894 A | * | 8/1983 | Tribe | F16D 55/224 188/71.9 |
| 4,412,137 A | * | 10/1983 | Hansen | F02N 11/0866 307/10.6 |
| 4,454,933 A | * | 6/1984 | Hunnicutt | F16D 65/567 188/71.9 |
| 4,543,984 A | * | 10/1985 | Murray | B60T 17/04 137/637.1 |
| 4,614,357 A | * | 9/1986 | Murray | B62D 53/085 280/428 |
| 4,621,874 A | * | 11/1986 | Gustafsson | B60R 25/08 303/89 |
| 4,917,443 A | * | 4/1990 | Kramer | B60T 8/885 303/122.04 |
| 5,004,299 A | * | 4/1991 | Brearley | B60T 8/96 303/122.1 |
| 5,067,778 A | * | 11/1991 | Testardi | B60T 8/00 303/119.2 |
| 5,074,626 A | * | 12/1991 | Kramer | B60T 8/885 303/122.04 |
| 5,273,348 A | * | 12/1993 | Yagi | B60T 8/24 303/119.2 |
| 5,362,135 A | * | 11/1994 | Riddiford | B60L 3/0076 303/3 |
| 5,366,280 A | * | 11/1994 | Littlejohn | B60L 3/0061 188/196 R |
| 5,366,281 A | * | 11/1994 | Littlejohn | B60L 7/16 303/3 |
| 5,515,949 A | * | 5/1996 | Baumgartner | F16D 65/18 384/908 |
| 5,622,240 A | * | 4/1997 | Hartl | F16D 65/568 188/72.9 |
| 5,892,441 A | * | 4/1999 | Woolley | G06K 17/00 340/8.1 |
| 6,040,665 A | * | 3/2000 | Shirai | F16D 65/18 318/563 |
| 6,208,497 B1 | * | 3/2001 | Seale | H02K 41/03 361/160 |
| 6,270,172 B1 | * | 8/2001 | Shirai | B60T 8/3255 303/112 |
| 6,293,363 B1 | * | 9/2001 | Rangaswamy | B60T 13/741 188/158 |
| 6,299,261 B1 | * | 10/2001 | Weiberle | B60T 13/74 303/122.04 |
| 6,504,491 B1 | * | 1/2003 | Christians | B60R 25/33 375/243 |
| 6,571,163 B1 | * | 5/2003 | Heckmann | B60T 13/662 318/362 |
| 6,749,269 B1 | * | 6/2004 | Niwa | B60T 13/741 303/20 |
| 7,108,107 B2 | * | 9/2006 | Ralea | F16D 66/02 188/1.11 L |
| 7,673,949 B2 | * | 3/2010 | Kuramochi | B60T 8/885 303/122.03 |
| 8,167,383 B2 | * | 5/2012 | Nishino | B60T 8/4872 303/122.09 |
| 9,030,321 B2 | * | 5/2015 | Breed | G01S 13/04 455/39 |
| 9,033,116 B2 | * | 5/2015 | Breed | G01S 13/04 340/568.1 |
| 11,407,396 B2 | * | 8/2022 | Takahashi | B60T 8/3265 |
| 2001/0043450 A1 | * | 11/2001 | Seale | H02N 15/00 361/160 |
| 2002/0113488 A1 | * | 8/2002 | Harris | B60T 13/745 303/113.1 |
| 2002/0117891 A1 | * | 8/2002 | Harris | B60T 13/58 303/122.04 |
| 2002/0193935 A1 | * | 12/2002 | Hashimoto | F02D 11/105 701/110 |
| 2004/0201270 A1 | * | 10/2004 | Suzuki | B60T 13/741 303/20 |
| 2004/0212249 A1 | * | 10/2004 | Yamaguchi | F16D 65/18 303/122.04 |
| 2005/0012385 A1 | * | 1/2005 | Sibre | B60T 8/885 303/20 |
| 2005/0225165 A1 | * | 10/2005 | Naik | B60T 8/321 303/20 |
| 2006/0118367 A1 | * | 6/2006 | Arakawa | B60T 13/741 188/73.1 |
| 2006/0163939 A1 | * | 7/2006 | Kuramochi | B60T 8/885 303/122.04 |
| 2006/0163941 A1 | * | 7/2006 | Von Hayn | B60T 7/042 303/155 |
| 2006/0273656 A1 | * | 12/2006 | Sherman | B66F 9/07509 303/89 |
| 2007/0114843 A1 | * | 5/2007 | Kawahara | B60T 13/74 303/122 |
| 2007/0204930 A1 | * | 9/2007 | Phallen | B67D 1/0888 222/394 |
| 2008/0314695 A1 | * | 12/2008 | Kim | B60T 13/741 188/72.7 |
| 2009/0045021 A1 | * | 2/2009 | Einbinder | B60T 17/22 74/502.2 |
| 2009/0071769 A1 | * | 3/2009 | Cheon | F16D 65/18 188/72.7 |
| 2010/0062897 A1 | * | 3/2010 | Nishino | B60T 7/042 477/29 |
| 2010/0147633 A1 | * | 6/2010 | Kim | B60T 13/02 303/122.04 |
| 2010/0251852 A1 | * | 10/2010 | Murata | F02N 11/0833 74/7 A |
| 2011/0153147 A1 | * | 6/2011 | Watanabe | F16D 65/18 188/72.4 |
| 2011/0266106 A1 | * | 11/2011 | Suzuki | B60T 8/96 188/360 |
| 2011/0316329 A1 | * | 12/2011 | Nishino | B60T 7/042 303/14 |
| 2012/0271508 A1 | * | 10/2012 | Kanemoto | F02N 11/0825 701/33.6 |
| 2013/0033381 A1 | * | 2/2013 | Breed | G08B 13/2417 340/568.1 |
| 2014/0202800 A1 | * | 7/2014 | Breed | B60T 7/16 340/568.1 |
| 2015/0041261 A1 | * | 2/2015 | Masuda | B60T 13/741 188/163 |
| 2015/0203086 A1 | * | 7/2015 | Miyazaki | B60T 8/4081 60/545 |
| 2015/0224895 A1 | * | 8/2015 | Morita | B60T 7/02 318/494 |
| 2017/0038768 A1 | * | 2/2017 | Ikai | F16D 66/00 |
| 2017/0050629 A1 | * | 2/2017 | Kim | B60T 13/662 |
| 2017/0204828 A1 | * | 7/2017 | Imura | F02N 11/0844 |
| 2018/0050670 A1 | * | 2/2018 | Feigel | B60T 13/662 |
| 2018/0056962 A1 | * | 3/2018 | Kilmurray | B60T 17/22 |
| 2018/0079398 A1 | * | 3/2018 | Baehrle-Miller | B60T 7/12 |
| 2018/0148021 A1 | * | 5/2018 | Mannherz | B60T 13/74 |
| 2018/0215368 A1 | * | 8/2018 | Isono | B60T 13/741 |
| 2018/0251105 A1 | * | 9/2018 | Baehrle-Miller | B60T 7/22 |
| 2019/0084793 A1 | * | 3/2019 | Nakari | G05B 19/048 |
| 2019/0100183 A1 | * | 4/2019 | Jung | B60T 7/042 |
| 2019/0359195 A1 | * | 11/2019 | Okada | B60T 13/741 |
| 2019/0366997 A1 | * | 12/2019 | Jeong | B60T 7/042 |
| 2020/0023823 A1 | * | 1/2020 | Baehrle-Miller | B60T 8/321 |
| 2020/0216048 A1 | * | 7/2020 | Lee | B60T 17/22 |
| 2020/0223408 A1 | * | 7/2020 | Goto | B60T 13/662 |
| 2020/0262399 A1 | * | 8/2020 | Yokoyama | B60T 8/00 |
| 2020/0290583 A1 | * | 9/2020 | Narematsu | B60T 13/686 |
| 2020/0317170 A1 | * | 10/2020 | Konno | B60T 13/161 |
| 2021/0070265 A1 | * | 3/2021 | Roether | B60W 10/20 |
| 2021/0129831 A1 | * | 5/2021 | Hecker | B60W 10/184 |
| 2021/0269048 A1 | * | 9/2021 | Herges | B60T 17/22 |
| 2022/0105914 A1 | * | 4/2022 | Leiber | B60T 13/662 |
| 2022/0144236 A1 | * | 5/2022 | Koo | B60T 13/662 |
| 2022/0144237 A1 | * | 5/2022 | Goto | B60T 13/741 |
| 2022/0153251 A1 | * | 5/2022 | Yokoyama | F16D 63/006 |
| 2022/0176931 A1 | * | 6/2022 | Kim | B60T 13/686 |

(56) References Cited

U.S. PATENT DOCUMENTS

| | | | |
|---|---|---|---|
| 2022/0355771 A1* | 11/2022 | Fujita | B60T 17/22 |
| 2023/0042441 A1* | 2/2023 | Fujita | B60W 50/029 |
| 2023/0092049 A1* | 3/2023 | Kim | B60T 8/58 |
| | | | 701/70 |
| 2023/0130785 A1* | 4/2023 | Kim | B60T 8/326 |
| | | | 303/113.4 |
| 2023/0141274 A1* | 5/2023 | Pabouctsidis | H02P 3/02 |
| | | | 318/447 |
| 2023/0142572 A1* | 5/2023 | Pabouctsidis | G01D 5/24461 |
| | | | 318/400.21 |
| 2023/0144377 A1* | 5/2023 | Adamopoulos | H02P 29/027 |
| | | | 318/371 |
| 2023/0146790 A1* | 5/2023 | Kim | B60T 8/267 |
| | | | 303/3 |
| 2023/0174037 A1* | 6/2023 | Kim | B60T 8/4081 |
| | | | 303/155 |
| 2023/0294651 A1* | 9/2023 | Cho | B60T 8/1761 |
| | | | 701/71 |

FOREIGN PATENT DOCUMENTS

| | | | | |
|---|---|---|---|---|
| DE | 112020003056 T5 | * | 3/2022 | B60T 13/74 |
| FR | 2880855 A1 | * | 7/2006 | B60T 13/74 |
| JP | H0565060 A | * | 3/1993 | |
| JP | 2000225935 A | * | 8/2000 | B60T 13/741 |
| JP | 2004-324856 | | 11/2004 | |
| JP | 2006-232259 | | 9/2006 | |
| JP | 2006232259 A | * | 9/2006 | B60T 13/741 |
| JP | 2008095909 A | * | 4/2008 | B60T 13/741 |
| JP | 2014129871 A | * | 7/2014 | B60T 13/741 |
| JP | 2015-211168 | | 11/2015 | |
| JP | 2015211168 A | * | 11/2015 | |
| KR | 20090006969 A | * | 1/2009 | |

OTHER PUBLICATIONS

Written Opinion of the International Searching Authority issued Apr. 7, 2020 in corresponding International Application No. PCT/JP2020-009961, with English translation.

* cited by examiner (A)

(B)

(C)

CONTROL APPARATUS

CROSS-REFERENCE TO RELATED APPLICATION

The present application claims priority under the Paris Convention to Japanese Patent Application No. 2019-080965 filed on Apr. 22, 2019. The entire disclosure of Japanese Patent Application No. 2019-080965 including the specification, the claims, the drawings, and the abstract is incorporated herein by reference in its entirety.

TECHNICAL FIELD

The present invention relates to a control apparatus for use in an electric brake apparatus that applies a braking force to a vehicle such as an automobile.

BACKGROUND ART

There is known an electric disk brake apparatus actuated based on driving of an electric motor as a brake apparatus mounted on a vehicle such as an automobile (refer to PTL 1). This electric disk brake apparatus is equipped with a parking brake function. Therefore, the electric disk brake apparatus can thrust forward a piston serving as a pressing member of a brake mechanism by the electric motor and hold the thrust piston by a thrust force holding mechanism (a holding mechanism).

CITATION LIST

Patent Literature

PTL 1: Japanese Patent Application Public Disclosure No. 2004-324856 (Japanese Patent No. 4254332)

SUMMARY OF INVENTION

Technical Problem

Then, the thrust force holding mechanism discussed in PTL 1 includes a solenoid. The thrust force for keeping the vehicle parked or stopped (a braking force) is maintained by the driving of this solenoid. Therefore, when an abnormality has occurred, the solenoid may be driven at an unintended timing (for example, while the vehicle is running).

An object of the present invention is to provide a control apparatus capable of preventing the solenoid from being erroneously driven at the unintended timing, thereby avoiding unintended holding of the thrust force.

Solution to Problem

According to one aspect of the present invention, a control apparatus includes a switching element configured to connect or shut off a power source circuit for supplying power to a solenoid, an arithmetic element configured to control actuation of the switching element, a diagnosis device configured to diagnose an abnormality in the arithmetic element, and a delay element provided between the arithmetic element and the switching element.

Further, according to another aspect of the present invention, a control apparatus includes a first switching element configured to connect or shut off a power source circuit for supplying power to a solenoid, a second switching element configured to connect or shut off the power source circuit, an arithmetic element configured to control actuation of the first switching element and the second switching element, a diagnosis device configured to diagnose an abnormality in the arithmetic element, and a delay element provided at any of a position between the arithmetic element and the first switching element or a position between the arithmetic element and the second switching element.

Further, according to another aspect of the present invention, a control apparatus includes a switching element configured to connect or shut off a power source circuit for supplying power to a solenoid, an arithmetic element configured to control actuation of the switching element, and a diagnosis device configured to diagnose an abnormality in the arithmetic element. The diagnosis device is another arithmetic element. The another arithmetic element is provided between the arithmetic element and the switching element. Further, the another arithmetic element delays a signal for controlling the actuation of the switching element that is output from the arithmetic element and outputs the signal for controlling the actuation of the switching element if no abnormality is detected in the arithmetic element while the signal is delayed. Further, the another arithmetic element does not output the signal for controlling the actuation of the switching element if the abnormality is detected in the arithmetic element while the signal is delayed.

Advantageous Effects of Invention

According to the aspects of the present invention, the control apparatus can prevent the solenoid from being erroneously driven at an unintended timing when an abnormality has occurred (for example, a failure in the arithmetic element), thereby avoiding unintended holding of the thrust force.

DESCRIPTION OF EMBODIMENTS

In the following description, control apparatuses according to embodiments will be described based on an example when they are applied to an electric brake apparatus of a four-wheeled automobile with reference to the drawings.

Figure 1:
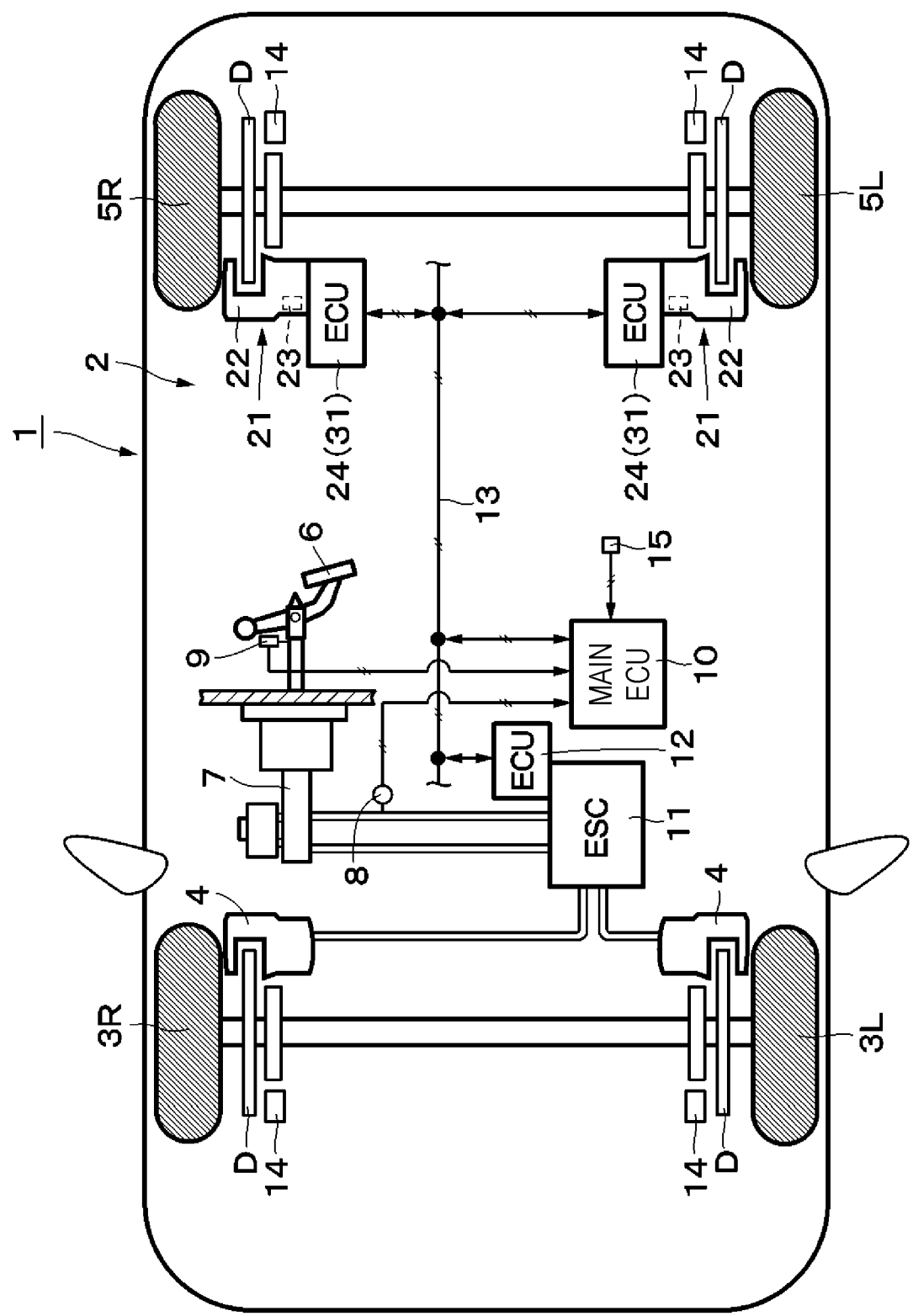
FIG. 1 schematically illustrates the system configuration of a vehicle on which rear electric brake ECUs according to an embodiment are mounted.
Figure 2:
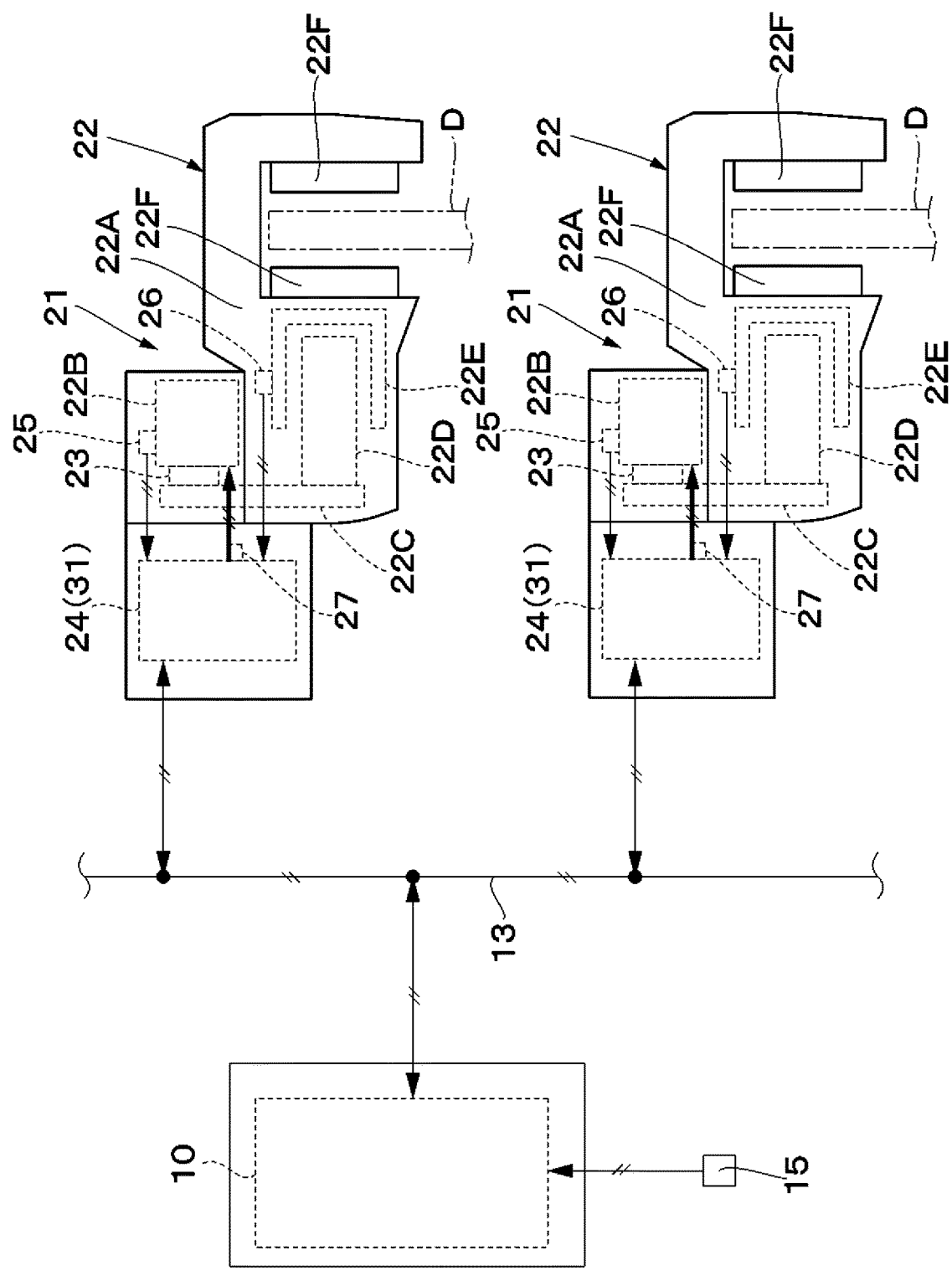
FIG. 2 schematically illustrates electric brake apparatuses illustrated in FIG. 1 together with a main ECU.

FIGS. 1 to 4 illustrate a first embodiment. In FIG. 1, a vehicle 1 is equipped with a brake apparatus 2 (a vehicle brake apparatus or a brake system), which applies braking forces to wheels (front wheels 3L and 3R and rear wheels 5L and 5R) to brake the vehicle 1. The brake apparatus 2 includes left and right hydraulic brake apparatuses 4 and 4 (front-side braking mechanisms), left and right electric brake apparatuses 21 and 21 (rear-side braking mechanisms), a master cylinder 7, and a hydraulic pressure sensor 8 and a pedal stroke sensor 9. The left and right hydraulic brake apparatuses 4 and 4 are provided in correspondence with the left-side front wheel 3L and the right-side front wheel 3R. The left and right electric brake apparatuses 21 and 21 are provided in correspondence with the left-side rear wheel 5L and the right-side rear wheel 5R. The master cylinder 7 generates a hydraulic pressure according to an operation (pressing) of a brake pedal 6 (an operation member). The hydraulic pressure sensor 8 and the pedal stroke 9 measure the amount of an operation performed by an operator (a driver) on the brake pedal 6.

The hydraulic brake apparatus 4 is formed by, for example, a hydraulic disk brake, and applies the braking force to the wheel (the front wheel 3L or 3R) according to the supply of the hydraulic pressure (a brake hydraulic pressure) thereto. The electric brake apparatus 21 is formed by, for example, an electric disk brake, and applies the braking force to the wheel (the rear wheel 5L or 5R) according to driving of an electric motor 22B (refer to FIG. 2). The hydraulic pressure sensor 8 and the pedal stroke sensor 9 are connected to a main ECU 10.

A hydraulic pressure supply apparatus 11 (hereinafter referred to as an ESC 11) is provided between the master cylinder 7 and the hydraulic brake apparatuses 4 and 4. The ESC 11 includes, for example, a plurality of control valves, a hydraulic pump, an electric motor, and a hydraulic pressure control reservoir (any of them is not illustrated). The hydraulic pump increases the brake hydraulic pressure. The electric motor drives this hydraulic pump. The hydraulic pressure control reservoir temporarily stores extra brake fluid therein. Each of the control valves and the electric motor in the ESC 11 are connected to a front hydraulic apparatus ECU 12. The front hydraulic apparatus ECU 12 includes a microcomputer. The front hydraulic apparatus ECU 12 controls the opening/closing of each of the control valves and the driving of the electric motor in the ESC 11 based on an instruction from the main ECU 10.

The main ECU 10 includes a microcomputer. The main ECU 10 calculates a target barking force for each of the wheels (the four wheels) according to a predetermined control program in reaction to inputs of signals from the hydraulic pressure sensor 8 and the pedal stroke sensor 9. The main ECU 10 transmits a braking instruction directed to each of the two front wheels to the front hydraulic apparatus ECU 12 (i.e., an ESC ECU) via a CAN 13 (Control Area Network) serving as a vehicle data bus based on the calculated braking force. The main ECU 10 transmits a braking instruction (a target thrust force) directed to each of the two rear wheels to each of rear electric brake ECUs 24 and 24 via the CAN 13 based on the calculated braking force.

Wheel speed sensors 14 and 14 are provided near the front wheels 3L and 3R and the rear wheels 5L and 5R, respectively. The wheel speed sensors 14 and 14 detect the speeds of these wheels 3L, 3R, 5L, and 5R (wheel speeds). The wheel speed sensors 14 and 14 are connected to the main ECU 10. The main ECU 10 can acquire the wheel speed of each of the wheels 3L, 3R, 5L, and 5R based on a signal from each of the wheel speed sensors 14 and 14.

Further, another ECU different from the main ECU 10 and the rear electric brake ECUs 24 is mounted on the vehicle 1 (for example, various kinds of ECUs including the front hydraulic apparatus ECU 12 and the like). Vehicle information transmitted from such another ECU via the CAN 13 is received by the main ECU 10. Now, the vehicle information corresponds to information such as the position of the AT range (or the MT shift), opening/closing of the door, and the number of rotations of the engine.

Further, a parking brake switch 15 is provided near a driver's seat. The parking brake switch 15 is connected to the main ECU 10. The parking brake switch 15 transmits a signal (an actuation request signal) corresponding to a request to actuate a parking brake (an application request working as a holding request or a release request working as an end request) according to an operation instruction from the driver to the main ECU 10. The main ECU 10 transmits a parking brake instruction directed to each of the two rear wheels to each of the rear electric brake ECUs 24 and 24 based on an operation on the parking brake switch 15 (the actuation request signal).

The electric brake apparatus 21 includes a brake mechanism 22, a parking mechanism 23, the main ECU 10 and the rear electric brake ECU 24. In this case, the electric brake apparatus 21 includes a rotational angle sensor 25, a thrust force sensor 26, and a current sensor 27 (refer to FIG. 2 for all of them). The rotational angle sensor 25 serves as a position detector that detects a motor rotational position to exert positional control and thrust force control. The thrust force sensor 26 serves as a thrust force detector that detects a thrust force (a piston thrust force). The current sensor 27 serves as a current detector that detects a motor current.

The brake mechanism 22 is provided for each of the left and right wheels of the vehicle 1, i.e., the rear left wheel 5L side and the rear right wheel 5R side. The brake mechanism 22 is configured as an electric brake mechanism. As illustrated in, for example, FIG. 2, the brake mechanism 22 includes a caliper 22A as a cylinder (a wheel cylinder), the electric motor 22B as an electric actuator, a speed reduction mechanism 22C, a rotation-linear motion conversion mechanism 22D, a piston 22E as a pressing member, brake pads 22F as a braking member (a pad), and a not-illustrated fail-open mechanism (a return spring). The electric motor 22B is driven (rotated) according to supply of power thereto, and thrusts forward the piston 22E. The electric motor 22B is controlled by the rear electric brake ECU 24 based on the braking instruction (the target thrust force) from the main ECU 10. The speed reduction mechanism 22C slows down the rotation of the electric motor 22B and transmits it to the rotation-linear motion conversion mechanism 22D.

The rotation-linear motion conversion mechanism 22D converts the rotation of the electric motor 22B transmitted via the speed reduction mechanism 22C into an axial displacement of the piston 22E (a linear-motion displacement). The piston 22E is thrust forward according to the driving of the electric motor 22B, and moves the brake pads 22F. The brake pads 22F are pressed against a disk rotor D as a braking receiving member (a disk) by the piston 22E. The disk rotor D rotates together with the wheel (the rear wheel 5L or 5R). When the braking is applied, the return spring applies a rotational force to a rotational member of the rotation-linear motion conversion mechanism 22D in a braking release direction. In the brake mechanism 22, the piston 22E is thrust forward so as to press the brake pads 22F against the disk rotor D based on the driving of the electric motor 22B. In other words, the brake mechanism 22 transmits the thrust force generated according to the driving of the electric motor 22B to the piston 22E moving the brake pads 22F.

The parking mechanism 23 is provided to each of the brake mechanisms 22 and 22, i.e., each of the brake mechanism 22 on the left side (the rear left wheel 5L side) and the brake mechanism 22 on the right side (the rear right wheel 5R side). The parking mechanism 23 keeps the piston 22E of the brake mechanism 22 in the forward thrust state. In other words, the parking mechanism 23 holds and releases the braking force. The parking mechanism 23 is formed by a ratchet mechanism (a lock mechanism), which prohibits (locks) the rotation by engaging an engagement claw (a lever member 23C) with a ratchet (a ratchet gear 23B) as illustrated in, for example, FIG. 3. More specifically, the parking mechanism 23 includes a solenoid 23A, the ratchet gear 23B serving as the ratchet, the lever member 23C serving as the engagement claw, and a compression spring 23D serving as a return spring. The solenoid 23A is driven by supply of power thereto (a plunger 23A1 thereof is displaced). The solenoid 23A is controlled by the main ECU 10 and the rear electric brake ECU 24. In other words, in the electric brake apparatus 21 that acquires the thrust force for braking the vehicle 1 based on the driving of the electric motor 22B different from the solenoid 23A, the solenoid 23A is used to drive the parking mechanism 23 provided for allowing the generated thrust force to be held without power supply to the solenoid 23A and the electric motor 22B. In sum, the parking mechanism 23 forms a thrust force holding mechanism for holding the thrust force when no power is supplied to the solenoid 23A and the electric motor 22B.

The ratchet gear 23B is integrally fixed to the rotational shaft 22B1 of the electric motor 22B of the brake mechanism 22. A plurality of claws 23B1 is provided on the outer peripheral side of the ratchet gear 23B at even intervals circumferentially. The claw 23B1 is engaged with a claw portion 23C1 of the lever member 23C. The claw portion 23C1 and a coupling portion 23C2 are formed on one end side and the other end side of the lever member 23C, respectively. The claw portion 23C1 is engaged with the claw 23B1 of the ratchet gear 23B. The coupling portion 23C2 is coupled with the plunger 23A1 of the solenoid 23A. The lever member 23C is reciprocated by the solenoid 23A so as to be engaged with or separated from the claw 23B1 of the ratchet gear 23B. The compression spring 23D applies an elastic force for separating the claw portion 23C1 of the lever member 23C from the claw 23B1 of the ratchet gear 23B.

The rear electric brake ECU 24 is provided in correspondence with each of the brake mechanisms 22 and 22, i.e., each of the brake mechanism 22 on the left side (the rear left wheel 5L side) and the brake mechanism 22 on the right side (the rear right wheel 5R side). The rear electric brake ECU 24 includes a microcomputer. The rear electric brake ECU 24 controls the brake mechanism 22 (the electric motor 22B) and the parking mechanism 23 (the solenoid 23A) based on the instruction from the main ECU 10. In other words, the rear electric brake ECU 24 forms a control apparatus (an electric brake control apparatus) that controls the driving of the electric motor 22B based on the braking instruction (the target thrust force). Along therewith, the rear electric brake ECU 24 forms a control apparatus (an electric parking control apparatus) that controls the driving of the parking mechanism 23 (the solenoid 23A) based on the actuation instruction. The braking instruction and the actuation instruction are input from the main ECU 10 to the rear electric brake ECU 24.

The rotational angle sensor 25 detects the rotational angle of the rotational shaft 22B1 of the electric motor 22B (a motor rotational angle). The rotational angle sensor 25 is provided in correspondence with each of the respective electric motors 22B of the brake mechanisms 22, and forms the position detector that detects the rotational position of the electric motor 22B (the motor rotational position). The thrust force sensor 26 detects a reaction force to the thrust force (the pressing force) applied from the piston 22E to the brake pads 22F. The thrust force sensor 26 is provided to each of the brake mechanisms 22, and forms the thrust force detector that detects the thrust force applied to the piston 22E (the piston thrust force). The current sensor 27 detects a current supplied to the electric motor 22B (the motor current). The current sensor 27 is provided in correspondence with each of the respective electric motors 22B of the brake mechanisms 22, and forms the current detector that detects the motor current of the electric motor 22B. The rotational angle sensor 25, the thrust force sensor 26, and the current sensor 27 are connected to the rear electric brake ECU 24.

The rear electric brake ECU 24 (and the main ECU 10 connected to this rear electric brake ECU 24 via the CAN 13) can acquire the rotational angle of the electric motor 22B based on the signal from the rotational angle sensor 25. The rear electric brake ECU 24 (and the main ECU 10) can acquire the thrust force applied to the piston 22E based on the signal from the thrust force sensor 26. The rear electric brake ECU 24 (and the main ECU 10) can acquire the motor current supplied to the electric motor 22B based on the signal from the current sensor 27.

Next, the operation of applying the braking and releasing the braking by the electric brake apparatus 21 while the vehicle 1 is running will be described. In the following description, this operation will be described citing the operation when the driver operates the brake pedal 6 as an example. However, the electric brake apparatus 21 also operates approximately similarly even in the case of autonomous brake, except that the operation in this case is different in terms of, for example, the fact that an instruction for the autonomous brake is output from an autonomous brake ECU (not illustrated) or the main ECU 10 to the rear electric brake ECU 24.

For example, when the driver operates the brake pedal 6 by pressing it while the vehicle 1 is running, the main ECU 10 outputs the instruction according to the pressing operation on the brake pedal 6 (for example, the target thrust force corresponding to the instruction to apply the braking) to the rear electric brake ECU 24 based on the detection signal input from the pedal stroke sensor 9. The rear electric brake ECU 24 drives (rotates) the electric motor 22B in a forward direction, i.e., in a braking application direction (an application direction) based on the instruction from the main ECU 10. The rotation of the electric motor 22B is transmitted to the rotation-linear motion conversion mechanism 22D via the speed reduction mechanism 22C, and the piston 22E is moved forward toward the brake pads 22F.

As a result, the brake pads 22F and 22F are pressed against the disk rotor D, and the braking force is applied. The braking state is established by controlling the driving of the electric motor 22B based on the detection signals from the pedal stroke sensor 9, the rotational angle sensor 25, the thrust force sensor 26, and the like at this time. While such control is ongoing, a force in the braking release direction is applied to the rotational member of the rotation-linear motion conversion mechanism 22D and thus the rotational shaft 22B1 of the electric motor 22B by the not-illustrated return spring provided to the brake mechanism 22.

On the other hand, when the brake pedal 6 is operated toward a pressing release side, the main ECU 10 outputs an instruction according to this operation (for example, the target thrust force corresponding to the braking release instruction) to the rear electric brake ECU 24. The rear electric brake ECU 24 drives (rotates) the electric motor 22B in a reverse direction, i.e., a braking end direction (a release direction) based on the instruction from the main ECU 10. The rotation of the electric motor 22B is transmitted to the rotation-linear motion conversion mechanism 22D via the speed reduction mechanism 22C, and the piston 22E is moved backward in a direction away from the brake pads 22F. Then, when the pressing of the brake pedal 6 is completely released, the brake pads 22F and 22F are separated from the disk rotor D, thereby releasing the braking force. In a non-braking state in which the braking is released in this manner, the not-illustrated return spring provided to the brake mechanism 22 is returned to the initial state thereof.

Next, the operation of providing (applying) the braking and ending (releasing) the braking by the parking brake will be described. In the following description, this operation will be described citing the operation when the driver operates the parking brake switch 15 as an example. However, the parking brake also operates approximately similarly even in the case of autonomous parking brake (automatic application and automatic release), except that the operation in this case is different in terms of, for example, the fact that an instruction therefor (an automatic application instruction and an automatic release instruction) is output based on a determination about the autonomous parking brake by the main ECU 10.

Figure 3:
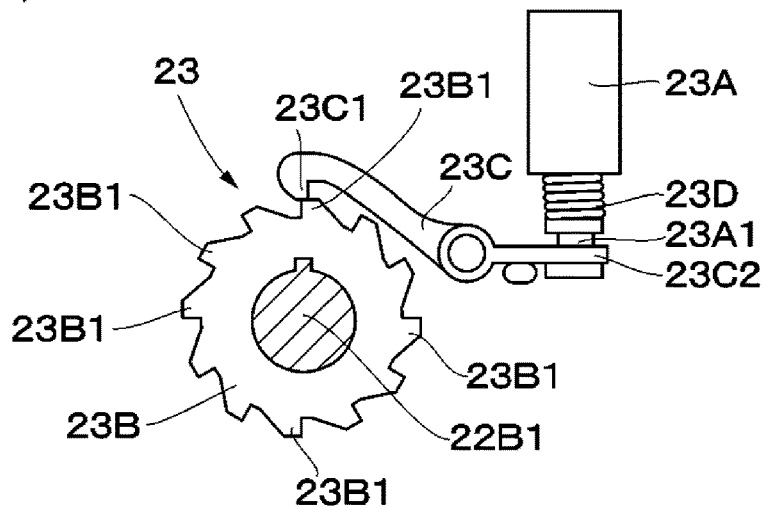
FIG. 3 illustrate an operation of a parking mechanism.
Figure 3:
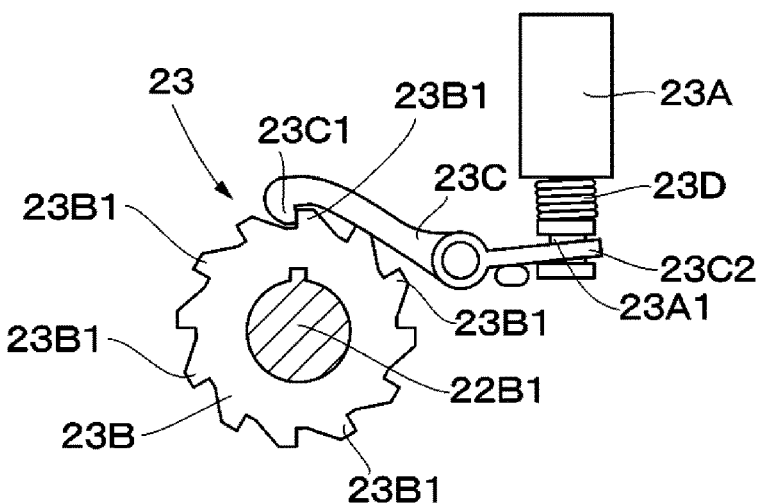
Figure 3:
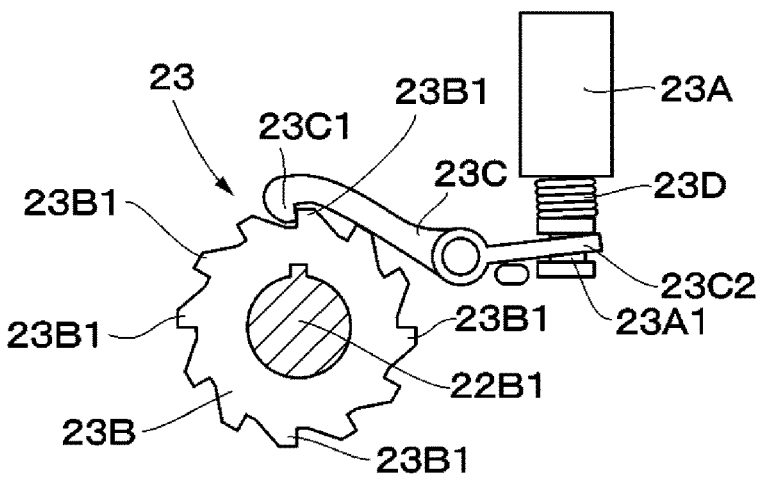

For example, when the parking brake switch 15 is operated toward an application side by the driver, the main ECU 10 actuates (applies) the parking brake. In this case, the main ECU 10 first rotates the electric motor 22B of the brake mechanism 22 toward a thrust force generation side (the application side: the clockwise direction in FIG. 3) via the rear electric brake ECU 24, thereby pressing the brake pads 22F and 22F against the disk brake D with a desired force (for example, a force capable of keeping the vehicle 1 stopped). In this state, the main ECU 10 actuates the solenoid 23A of the parking mechanism 23 via the rear electric brake ECU 24. More specifically, the main ECU 10 presses the claw portion 23C1 of the lever member 23C against the claw 23B1 of the ratchet gear 23B by retracting the plunger 23A1 of the solenoid 23A (displacing it upward in FIG. 3). At this time, these claw portion 23C1 and claw 23B1 may fail to be engaged with each other due to abutment (interference) of the claw portion 23C1 of the lever member 23C with the top edge of the claw 23B1 of the gear 23B as illustrated in FIG. 3(A).

The main ECU 10 next rotates the electric motor 22B toward a force reduction side (the release side: the counterclockwise direction in FIG. 3) via the rear electric brake ECU 24. This rotation can ensure that the claw portion 23C1 and the claw 23B1 are engaged with each other as illustrated in FIG. 3(B) even when the claw portion 23C1 and the claw 23B1 has failed to be engaged with each other. In this state, the main ECU 10 stops the power supply to the electric motor 22B and also stops the power supply to the solenoid 23A after confirming whether a predetermined thrust force (for example, the thrust force capable of keeping the vehicle stopped) is achieved with use of, for example, the thrust force sensor 26. At this time, the rotational force in the force reduction side (the release side) (the force in the counterclockwise direction in FIG. 3) is applied to the ratchet gear 23B (i.e., the rotational shaft 22B1 of the electric motor 22B) based on the elastic force of the not-illustrated return spring provided to the brake mechanism 22. Therefore, the engagement state between the claw portion 23C1 and the claw 23B1 is maintained as illustrated in FIG. 3(C) even after the power supply to the solenoid 23A is stopped. This allows the braking state to be maintained with the power supply stopped for the electric motor 22B and the solenoid 23A.

On the other hand, when the parking brake switch 15 is operated toward a release side, the main ECU 10 ends (releases) the actuation of the parking brake. In this case, the main ECU 10 slightly rotates the electric motor 22B toward the thrust force generation side (the application side) without supplying power to the solenoid 23A. As a result, the engagement between the claw portion 23C1 of the lever member 23C and the claw 23B1 of the ratchet gear 23B is loosened, and the lever member 23C is pivotally moved in a direction for releasing the engagement between the claw portion 23C1 and the claw 23B1 (the clockwise direction) due to the spring force of the compression spring 23D. Then, the main ECU 10 rotates the electric motor 22B in the force reduction side (the release side) to release the braking after confirming whether the thrust force changes with use of the thrust force sensor 26.

Then, PTL 1 discusses the electric caliper (the electric brake apparatus) that holds the thrust force for keeping the vehicle parked or stopped with use of the thrust force holding mechanism (the holding mechanism). In this case, the thrust force holding mechanism includes a ratchet provided so as to rotate together with the electric motor, and an engagement claw disposed on the outer peripheral side of this ratchet and capable of being engaged with and disengaged from this ratchet.

When holding the thrust force, the thrust force holding mechanism causes the engagement claw to be engaged with the ratchet by the driving of the solenoid with the thrust force generated based on the rotation of the electric motor. As a result, the electric motor is prohibited from rotating toward the thrust force reducing side. After this engagement of the engagement claw with the ratchet, the thrust force is maintained even when the power supply to the electric motor and the solenoid is stopped.

Further, the electric motor and the solenoid of the electric caliper are controlled by a control apparatus equipped with a switching element (an FET) and the like. The control apparatus includes an arithmetic element such as a microcomputer, and controls the solenoid and the like based on an output (a driving signal) as a result of a calculation by the arithmetic element.

In the thrust force holding mechanism discussed in PTL 1, the engagement claw and the ratchet are engaged and the thrust force is held immediately when the solenoid is driven. Therefore, for example, when a failure has occurred in the arithmetic element, this may cause an erroneous signal to be output from the arithmetic element and the solenoid to be driven at an unintended timing, thereby making the vehicle behavior instable. For example, if the driver operates the brake pedal while the vehicle is running, the electric motor is driven based on the braking intension of the driver and the braking force is generated. If the solenoid is driven at the timing that the thrust force is generated in this manner, this undesirably makes it impossible to reduce the thrust force. As a result, the wheel rotationally driven at this time may be locked to cause the vehicle to spin.

PTL 1 discloses a technique for determining the actuation state of the thrust force holding mechanism using a current sensor. However, PTL 1 fails to discuss a method for avoiding erroneous driving of the solenoid at an unintended timing due to the occurrence of an abnormality such as a failure (for example, a failure in the arithmetic element). Therefore, the erroneous driving of the solenoid should be avoided when the arithmetic element runs out of control.

On the other hand, in the first embodiment, the rear electric brake ECU 24 as the control apparatus includes a delay element 24D. More specifically, the delay element 24D is provided between an arithmetic element 24A (the microcomputer) of the rear electric brake ECU 24 and a first switching element 24C (an FET) for driving the solenoid 23A of the parking mechanism 23. The delay element 24D delays a signal for driving this first switching element 24C. Further, in the first embodiment, the rear electric brake ECU 24 includes a diagnosis device 24G for diagnosing the actuation state of the arithmetic element 24A. The diagnosis device 24G shuts off the power supply to the solenoid 23A regardless of the state of the signal (the driving signal) of the solenoid 23A if diagnosing that the actuation state of the arithmetic element 24A is abnormal.

Further, a delay time created by the delay element 24D is set to a longer time than an abnormality determination time spent by the diagnosis device 24G. Therefore, the solenoid 23A can be controlled after the diagnosis device 24G determines whether the actuation state of the arithmetic element 24A is normal or abnormal. For example, if the diagnosis device 24G determines that the actuation state of the arithmetic element 24A is abnormal, the rear electric brake ECU 24 can avoid erroneous driving of the solenoid 23A due to a failure in the arithmetic element 24A by shutting off the power supply to the solenoid 23A by the diagnosis device 24G. In other words, the rear electric brake ECU 24 can prevent the solenoid 23A from being erroneously driven at an unintended timing, and avoid unintended holding of the thrust force.

Now, the abnormality determination time is a time in milliseconds (for example, 10 msec or so). The delay time is set to a longer time than this abnormality determination time. The maximum value of the delay time is one second or shorter, and, for example, 100 msec or so.

Figure 4:
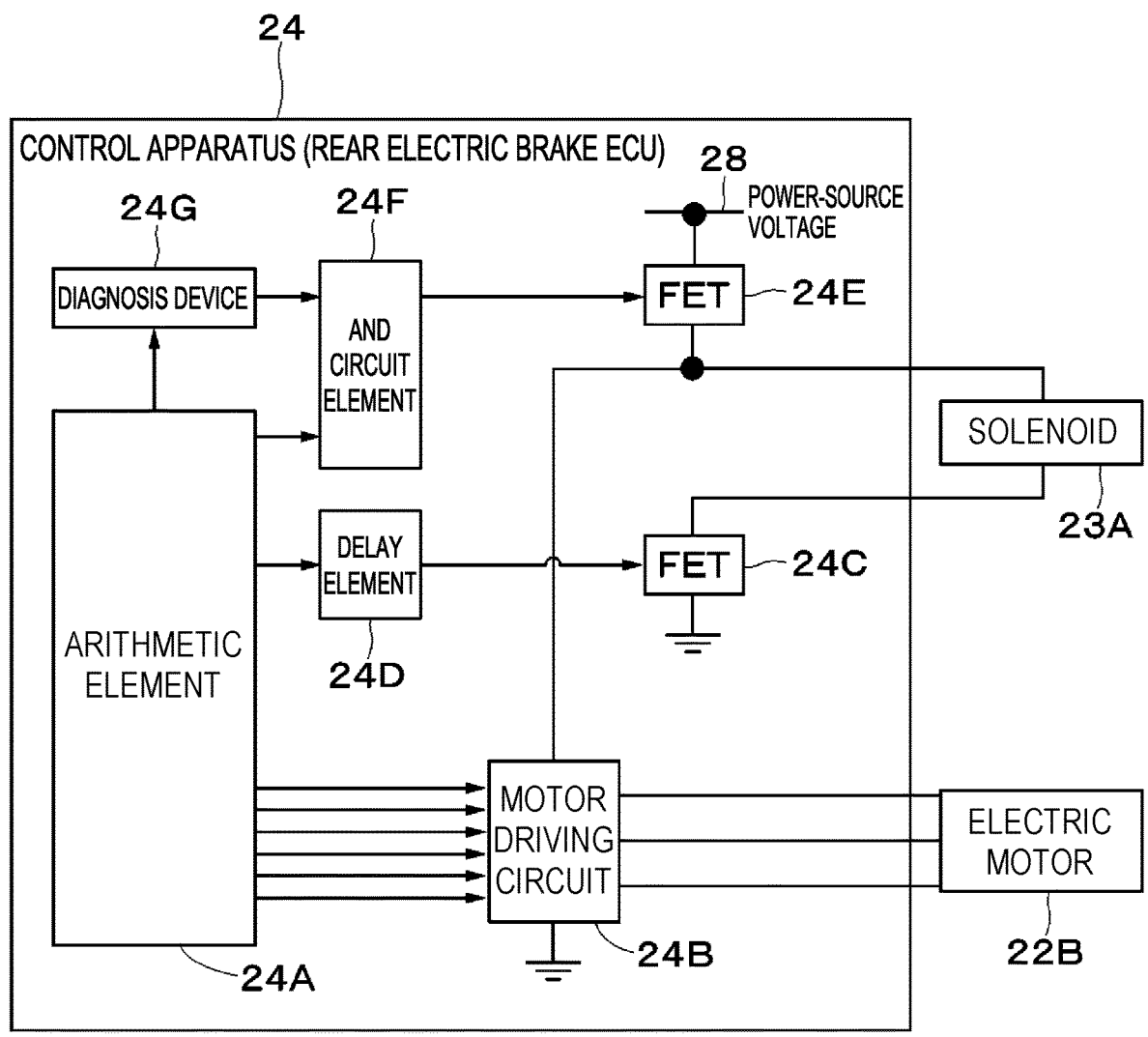
FIG. 4 is a circuit diagram illustrating the rear electric brake ECU according to the first embodiment.

Next, FIG. 4 illustrates the circuit diagram of the rear electric brake ECU 24 for driving the electric motor 22B and the solenoid 23A of the parking mechanism 23.

The rear electric brake ECU 24 includes the arithmetic element 24A. The arithmetic element 24A is formed by the microcomputer. The arithmetic element 24A controls the actuation of a motor driving circuit 24B and the switching elements 24C and 24E. The output side of the arithmetic element 24A is connected to the motor driving circuit 24B for driving the electric motor 22B, the delay element 24D for outputting the driving signal to the first switching element 24C (the FET) for driving the solenoid 23A, and an AND circuit element 24F for driving the second switching element 24E (an FET).

Further, the rear electric brake ECU 24 includes the diagnosis device 24G. The diagnosis device 24G is connected to the arithmetic element 24A to become able to diagnose whether a calculation executed in the arithmetic element 24A is normal or not. Further, the diagnosis device 24G is connected to the AND circuit element 24F to become able to shut off the second switching element 24E if determining that the arithmetic element 24A is abnormal.

The motor driving circuit 24B includes, for example, an inverter, and converts direct-current power from a power source circuit 28 into alternating-current power and supplies it to the electric motor 22B. The motor driving circuit 24B includes a plurality of switching elements (not illustrated) for controlling the electric motor 22B. Each of the switching elements is formed by, for example, a transistor, a field-effect transistor (FET), or an insulated gate bipolar transistor (IGBT). The motor driving circuit 24B controls ON/OFF of each of the switching elements based on a control signal from the arithmetic element 24A. Due to this control, the motor driving circuit 24B adjusts power (a current) to supply to the electric motor 22B, thereby controlling the driving of the electric motor 22B. The motor driving circuit 24B may include a sensor (for example, the current sensor 27 illustrated in FIG. 2) in addition to each of the switching elements.

The first switching element 24C is used to drive the solenoid 23A. The first switching element 24C is disposed on the downstream side of the solenoid 23A. In other words, the first switching element 24C is arranged between the solenoid 23A and the ground (GND). The delay element 24D delays the driving signal from the arithmetic element 24A. The arithmetic element 24D is connected to a control terminal (a gate terminal) of the first switching element 24C. In this case, the delay element 24D is provided between the arithmetic element 24A and the first switching element 24C.

The present invention is not limited thereto, and, for example, the delay element 24D may be connected to the second switching element 24E disposed on the upstream side of the solenoid 23A. In other words, the delay element 24D may be provided between the arithmetic element 24A and the second switching element 24E. Further, like the first embodiment, two switching elements may be disposed on the upstream side and the downstream side of the solenoid to prevent the solenoid from being erroneously driven at the time of a failure such as short-circuiting of a harness for power supply to the solenoid and a failure in which the switching element itself is stuck to an ON state. In this case, the delay element may be set up so as to delay both the signal to the switching element on the upstream side of the solenoid and the signal to the switching element on the downstream side of the solenoid, or may be set up so as to delay one of these signals. In sum, the delay element may be arranged in a manner different from the above-described example as long as it is configured to prevent power from being immediately supplied to the solenoid at the time of the occurrence of an abnormality such as a failure in one portion of the element including an erroneous output of the arithmetic element.

Further, in the first embodiment, the rear electric brake ECU 24 includes the switching elements 24C and 24E. The switching elements 24C and 24E connect or shut off the power source circuit 28, which supplies power to the solenoid 23A. The power source circuit 28 is, for example, a supply source of a power-source voltage like a battery, and supplies power to the solenoid 23A and the electric motor 22B. The power source circuit 28 supplies power to the solenoid 23A (i.e., applies the "power-source voltage" illustrated in FIG. 4) when the first switching element 24C and the second switching element 24E are brought into a connection state. When the signal output from the arithmetic element 24A is input via the delay element 24D, the first switching element 24C for supplying power to the solenoid 23A is brought into the connection state (ON) or a shut-off state (OFF) according to the signal.

On the other hand, the second switching element 24E is used to supply power to the solenoid 23A and the electric motor 22B. The second switching element 24E is disposed on the upstream side of the solenoid 23A. In other words, the second switching element 24E is arranged between the power source circuit 28 and the solenoid 23A. The second switching element 24E is controlled via the AND circuit element 24F so as to become able to be driven only when both the arithmetic element 24A and the diagnosis device 24G permit the driving. The purpose therefor is to keep the second switching element 24E controllable as long as the arithmetic element 24A is normal because the arithmetic element 24A controls the electric brake apparatus 21. A signal according to the result of the diagnosis by the diagnosis device 24G and a signal according to the result of the calculation by the arithmetic element 24A are input to the AND circuit element 24F. The AND circuit element 24F calculates a logical AND of these two signals, and outputs a signal according to the result of the calculation to the second switching element 24E. Therefore, if the diagnosis device 24G outputs an ON signal according to the normal state of the arithmetic element 24A and the arithmetic element 24A outputs an ON signal for permitting power supply to the solenoid 23A, the AND circuit element 24F outputs an ON signal for bringing the second switching element 24E into the connection state (ON). On the other hand, if at least any one of the diagnosis device 24G and the arithmetic element 24A outputs an OFF signal, the AND circuit element 24F outputs an OFF signal for bringing the second switching element 24E into the shut-off state (OFF).

Each of the switching elements 24C and 24E may be a semiconductor element such as a field-effect transistor (FET) using a semiconductor, or may be a mechanical relay element that operates by power supply to a coil. Further, the rear electric brake ECU 24 is configured in such a manner that the power supply to the solenoid 23A and the power supply to the electric motor 22B can be shut off by the second switching element 24E at the same time in the first embodiment, but the switching elements may be disposed so as to be able to shut off each of them individually.

The diagnosis device 24G diagnoses an abnormality in the arithmetic element 24A, and stops the power supply from the power source circuit 28 to the solenoid 23A if the arithmetic element 24A is abnormal. In other words, the diagnosis device 24G is an element for diagnosing whether the arithmetic element 24A is normal. The diagnosis device 24G is formed by, for example, a dedicated IC (for example, an ASIC) capable of switching ON/OFF of an output signal according to an input of a signal from outside. The diagnosis device 24G may receive a result of monitoring the state of the calculation that the arithmetic element 24A itself executes with use of communication between CPUs (central processing units) by being connected to the arithmetic element 24A. Further, for example, the rear electric brake ECU 24 may be configured in such a manner that the arithmetic element 24A outputs a signal simply repeating ON/OFF according to a predetermined cycle and the diagnosis device 24G determines that the arithmetic element 24A is abnormal, for example, if the signal from the arithmetic element 24A is absent for a predetermined time. The diagnosis device 24G may use a plurality of monitoring methods.

If detecting an abnormality in the arithmetic element 24A, the diagnosis device 24G outputs the OFF signal to the AND circuit element 24F. In this case, the AND circuit element 24F outputs the signal for bringing the second switching element 24E into the shut-off state according to the OFF signal from the diagnosis device 24G. As a result, the second switching element 24E is brought into the shut-off state, and the power supply to the solenoid 23A and the electric motor 22B is stopped.

On the other hand, if no abnormality is detected in the arithmetic element 24A, the diagnosis device 24G constantly outputs the ON signal. In this case, the AND circuit element 24F outputs a signal according to the result of the calculation by the arithmetic element 24A. This allows the second switching element 24E to be controlled according to the result of the calculation by the arithmetic element 24A.

Next, the delay element 24D will be described. The delay element 24D delays the driving signal output from the arithmetic element 24A for driving the first switching element 24C by a preset predetermined time. Further, the delay element 24D may use, for example, a circuit formed by a timer counter or the like besides a filter circuit such as a low-pass filter having a predetermined time constant. Further, desirably, the delay time is a time longer than the time taken to diagnose an abnormality in the arithmetic element 24A that is conducted by the diagnosis device 24G. In other words, the delay element 24D delays the driving of the first switching element 24C by a time longer than the time taken to diagnose an abnormality in the arithmetic element 24A by the diagnosis device 24G. As a result, the second switching element 24E can be shut off by the diagnosis device 24G during the delay time when the control signal of the first switching element 24C is output due to the occurrence of an abnormality such as a failure in the arithmetic element 24A. Therefore, even when the signal is output from the delay element 24D, no power is supplied to the solenoid 23A and erroneous driving of the solenoid 23A can be avoided.

Lastly, the operation at the time of the abnormality determination will be described in further detail. When an abnormality is detected in the arithmetic element 24A, not only the driving signal of the solenoid 23A but also the control signal for driving the electric motor 22B may be abnormal. Therefore, the control signal of the diagnosis device 24G directed to the second switching element 24E is set to OFF, and therefore the second switching element 24E is shut off and the power supply to the solenoid 23A and the electric motor 22B is stopped.

At this time, erroneous driving of the solenoid 23A is avoided with the aid of the circuit configuration of the rear electric brake ECU 24 according to the first embodiment. Therefore, the electric motor 22B, to which the power supply is stopped, is rotated in the force reduction direction (the release direction) due to the thrust force generated by the electric motor 22B itself and the return force accumulated in the return spring, thereby releasing the thrust force. Therefore, for example, no lock of the wheel (the rear wheel 5L or 5R) occurs, and the safe state (safety) can be excellently secured.

In this manner, according to the first embodiment, the rear electric ECU 24 includes the first switching element 24C that connects or shuts off the power source circuit 28 for supplying power to the solenoid 23A, the arithmetic element 24A that controls the actuation of the first switching element 24C, the diagnosis device 24G that diagnoses an abnormality in the arithmetic element 24A, and the delay element 24D provided between the arithmetic element 24A and the first switching element 24C. Therefore, with the aid of the delay element 24D, the rear electric brake ECU 24 can delay the input of the signal from the arithmetic element 24A to the first switching element 24C, thereby delaying the power supply to the solenoid 23A. As a result, when an abnormality has occurred in the arithmetic element 24A, the rear electric brake ECU 24 can determine the abnormality in the arithmetic element 24A by the diagnosis device 24G and shut off the power supply to the solenoid 23A before the first switching element 24C is brought into the connection state in reaction to the signal from the arithmetic element 24A.

Further, the rear electric brake ECU 24 includes the first switching element 24C that connects or shuts off the power source circuit 28 for supplying power to the solenoid 23A, the second switching element 24E that connects or shuts off the power source circuit 28, the arithmetic element 24A that controls the actuation of the first switching element 24C and the second switching element 24E, the diagnosis device 24G that diagnoses an abnormality in the arithmetic element 24A, and the delay element 24D provided between the arithmetic element 24A and the first switching element 24C. Therefore, with the aid of the delay element 24D, the rear electric brake ECU 24 can delay the input of the signal from the arithmetic element 24A to the first switching element 24C, thereby delaying the power supply to the solenoid 23A. As a result, when an abnormality has occurred in the arithmetic element 24A, the rear electric brake ECU 24 can bring the second switching element 24E into the shut-off state by the diagnosis device 24G before the first switching element 24C is brought into the connection state in reaction to the signal from the arithmetic element 24A. As a result, the rear electric brake ECU 24 can immediately shut off the power supply to the solenoid 23A when the arithmetic element 24A is abnormal, thereby preventing the solenoid 23A from being erroneously driven according to the abnormality in the arithmetic element 24A.

The power source circuit 28 supplies power to the solenoid 23A when the first switching element 24C and the second switching element 24E are brought into the connection state. In other words, the power source circuit 28 supplies power to the solenoid 23A when both the first switching element 24C and the second switching element 24E are brought into the connection state. On the other hand, the power source circuit 28 does not supply power to the solenoid 23A when at least one of the first switching element 24C and the second switching element 24E is brought into the shut-off state. Therefore, the power supply to the solenoid 23A can be stopped by bringing any one of the first switching element 24C and the second switching element 24E into the shut-off state.

Further, the diagnosis device 24G stops the power supply from the power source circuit 28 to the solenoid 23A if the arithmetic element 24A is abnormal. As a result, the rear electric brake ECU 24 can avoid erroneous driving of the solenoid 23A due to an abnormality (for example, a failure) in the arithmetic element 24A. In other words, the rear electric brake ECU 24 can prevent the solenoid 23A from being erroneously driven at an unintended timing, and avoid unintended holding of the thrust force.

Further, the delay element 24D delays the driving of the first switching element 24C by a time longer than the time taken to diagnose an abnormality in the arithmetic element 24A by the diagnosis device 24G. Therefore, the rear electric brake ECU 24 can start the control of the solenoid 23A after determining whether the actuation state of the arithmetic element 24A is normal or abnormal by the diagnosis device 24G. For example, if the actuation state of the arithmetic element 24A is determined to be abnormal by the diagnosis device 24G, the rear electric brake ECU 24 can shut off the power supply to the solenoid 23A by the diagnosis device 24G before the first switching element 24C is switched to the connection state (ON) in reaction to the signal from the arithmetic element 24A. As a result, the rear electric brake ECU 24 can avoid erroneous driving of the solenoid 23A due to a failure in the arithmetic element 24A. In other words, the rear electric brake ECU 24 can prevent the solenoid 23A from being erroneously driven at an unintended timing, and avoid unintended holding of the thrust force.

According to the first embodiment, in the electric brake apparatus 21 that acquires the thrust force for braking the vehicle 1 based on the driving of the electric motor 22B different from the solenoid 23A, the solenoid 23A is used to drive the parking mechanism 23 provided for allowing the generated thrust force to be held without power supply to the solenoid 23A and the electric motor 22B. Due to this configuration, the thrust force for braking the vehicle 1 can be held by the driving of the solenoid 23A for controlling the parking mechanism 23 even with no power supplied to the solenoid 23A and the electric motor 22B. In addition thereto, the present configuration can prevent the solenoid 23A from being erroneously driven with the aid of the delay element 24D and the like, thereby preventing the parking mechanism 23 from being erroneously driven and avoiding unintended holding of the thrust force.

Figure 5:
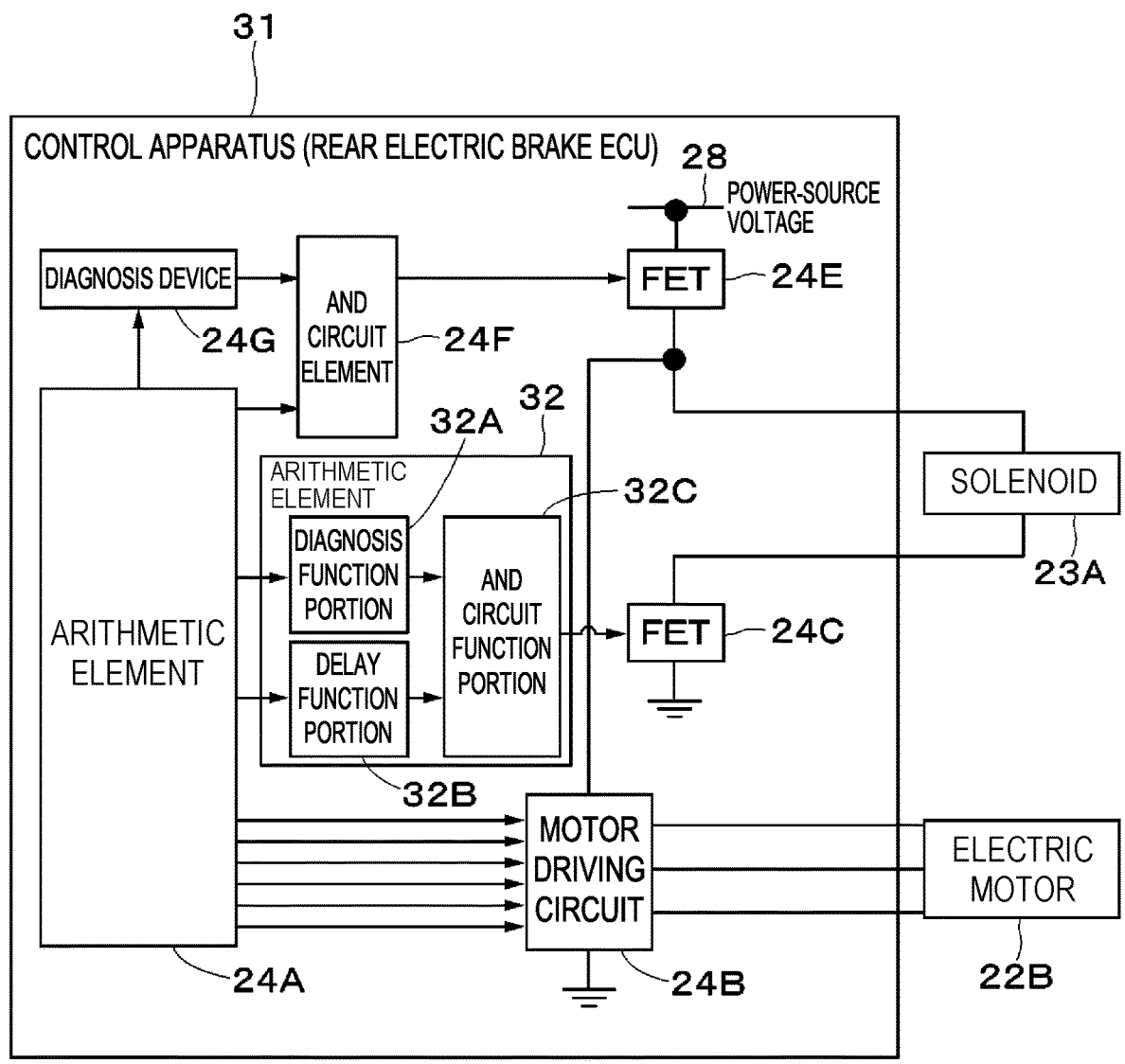
FIG. 5 is a circuit diagram illustrating a rear electric brake ECU according to a second embodiment.

Next, FIG. 5 illustrates a second embodiment. The second embodiment is characterized in that another arithmetic element (a diagnosis device) including a diagnosis function portion, a delay function portion, and an AND circuit function portion is provided between the arithmetic element and the first switching element. The second embodiment will be described, indicating similar constituent components to the first embodiment by the same reference numerals and omitting descriptions thereof.

A rear electric brake ECU 31 according to the second embodiment is configured approximately similarly to the rear electric brake ECU 24 according to the first embodiment. Therefore, the rear electric brake ECU 31 includes the arithmetic element 24A, the motor driving circuit 24B, the first switching element 24C, the second switching element 24E, the AND circuit element 24F, and the diagnosis device 24G. In addition thereto, the rear electric brake ECU 31 includes another arithmetic element 32 as the diagnosis device.

The arithmetic element 32 is formed by, for example, a microcomputer. The arithmetic element 32 is arranged between the arithmetic element 24A and the first switching element 24C, and forms the diagnosis device that diagnoses an abnormality in the arithmetic element 24A. The arithmetic element 32 includes a diagnosis function portion 32A, a delay function portion 32B, and an AND circuit function portion 32C.

The diagnosis function portion 32A has an approximately similar function to the diagnosis device 24G. The diagnosis function portion 32A diagnoses an abnormality in the arithmetic element 24A. The diagnosis function portion 32A outputs an OFF signal to the AND circuit function portion 32C if detecting an abnormality in the arithmetic element 24A. As a result, the first switching element 24C is brought into the shut-off state, and the power supply to the solenoid 23A and the electric motor 22B is stopped. On the other hand, the diagnosis function portion 32A outputs an ON signal to the AND circuit function portion 32C if detecting no abnormality in the arithmetic element 24A. In this case, the first switching element 24C becomes controllable according to a result of the calculation by the arithmetic element 24A.

The delay function portion 32B has an approximately similar function to the delay element 24D according to the first embodiment. The delay function portion 32B delays the signal output from the arithmetic element 24A for driving the first switching element 24C by a preset predetermined time. More specifically, the delay function portion 32B delays the driving of the first switching element 24C by a time longer than the time taken to diagnose an abnormality in the arithmetic element 24A by the diagnosis function portion 32A.

The AND circuit function portion 32C has an approximately similar function to the AND circuit element 24F according to the first embodiment. The signal according to the result of the diagnosis by the diagnosis function portion 32A is input to the AND circuit function portion 32C, and the signal according to the result of the calculation by the arithmetic element 24A is input to the AND circuit function portion 32C via the delay function portion 32B. The AND circuit function portion 32C calculates a logical AND of these two signals, and outputs a signal according to the result of the calculation to the first switching element 24C. Therefore, if the diagnosis function portion 32A outputs the ON signal according to the normal state of the arithmetic element 24A and the arithmetic element 24A outputs the ON signal for permitting power supply to the solenoid 23A, the AND circuit function portion 32C outputs an ON signal for bringing the first switching element 24C into the connection state (ON). On the other hand, if at least any one of the diagnosis function portion 32A and the arithmetic element 24A outputs the OFF signal, the AND circuit function portion 32C outputs an OFF signal for bringing the first switching element 24C into the shut-off state (OFF).

In this manner, when an abnormality is detected in the arithmetic element 24A, the AND circuit function portion 32C outputs the OFF signal for bringing the first switching element 24C into the shut-off state (OFF) based on the result of the diagnosis by the diagnosis function portion 32A independently of the signal from the delay function portion 32B. Therefore, when an abnormality is detected in the arithmetic element 24A, the signal for driving the first switching element 24C is not output. In other words, the arithmetic element 32 delays the signal for controlling the actuation of the first switching element 24C that is output from the arithmetic element 24A. The arithmetic element 32 outputs the signal for controlling the actuation of the first switching element 24C via the AND circuit function portion 32C if no abnormality is detected in the arithmetic element 24A while the signal from the arithmetic element 24A is delayed. On the other hand, the arithmetic element 32 does not output the signal for controlling the actuation of the first switching element 24C if an abnormality is detected in the arithmetic element 24A while the signal from the arithmetic element 24A is delayed. Due to this control, the rear electric brake ECU 31 can avoid erroneous driving of the solenoid 23A without shutting off the second switching element 24E in the second embodiment.

In this manner, according to the second embodiment, the rear electric brake ECU 31 includes the first switching element 24C that connects or shuts off the power source circuit 28 for supplying power to the solenoid 23A, the arithmetic element 24A that controls the actuation of the switching element 24C, and the another arithmetic element 32 as the diagnosis device that diagnoses an abnormality in the arithmetic element 24A. The basic function of the second embodiment is not especially different from the function of the first embodiment. Especially, according to the second embodiment, the arithmetic element 32 as the diagnosis device is provided between the arithmetic element 24A and the first switching element 24C. The arithmetic element 32 delays the signal for controlling the actuation of the first switching element 24C that is output from the arithmetic element 24A, and outputs the signal for controlling the actuation of the first switching element 24C via the AND circuit function portion 32C if no abnormality is detected in the arithmetic element 24A while the signal from the arithmetic element 24A is delayed. On the other hand, the arithmetic element 32 does not output the signal for controlling the actuation of the first switching element 24C if an abnormality is detected in the arithmetic element 24A while the signal from the arithmetic element 24A is delayed.

Therefore, the rear electric brake ECU 31 can diagnose an abnormality (the actuation state) of the arithmetic element 24A by the arithmetic element 32 as the diagnosis device. More specifically, the arithmetic element 32 determines normality/abnormality of the signal for controlling the actuation of the first switching element 24C that is output from the arithmetic element 24A by being placed between the arithmetic element 24A and the first switching element 24C. Therefore, the arithmetic element 32 can determine whether to output the signal from the arithmetic element 24A to the first switching element 24C according to whether the arithmetic element 24A is normal or not. That is, the arithmetic element 32 delays the signal from the arithmetic element 24A, and outputs the signal if no abnormality is detected in the arithmetic element 24A while the signal is delayed. As a result, the first switching element 24C connects the power source circuit 28 for supplying power to the solenoid 23A.

On the other hand, the arithmetic element 32 does not output the signal if an abnormality is detected in the arithmetic element 24A while the signal is delayed. As a result, the first switching element 24C shuts off the power source circuit 28 for supplying power to the solenoid 23A. Due to this configuration, the rear electric brake ECU 31 can avoid erroneous driving of the solenoid 23A due to an abnormality (for example, a failure) in the arithmetic element 24A. In other words, the rear electric brake ECU 31 can prevent the solenoid 23A from being erroneously driven at an unintended timing, and avoid unintended holding of the thrust force.

The first embodiment has been described citing the example when the rear electric brake ECU 24 is configured in such a manner that the arithmetic element 24A and the delay element 24D are provided in the rear electric brake ECU 24 as the same control apparatus. However, the present invention is not limited thereto, and, for example, the arithmetic element and the delay element may be provided in different ECUs. The same also applies to the second embodiment. More specifically, the second embodiment has been described citing the example when the rear electric brake ECU 31 is configured in such a manner that the arithmetic element 24A and the another arithmetic element 32 as the diagnosis device are provided in the rear electric brake ECU 31 as the same control apparatus. However, the present invention is not limited thereto, and, for example, the arithmetic element and the another arithmetic element as the diagnosis device may be provided in different ECUs.

In each of the embodiments, the first switching element 24C is disposed on the downstream side of the solenoid 23A and the second switching element 24E is disposed on the upstream side of the solenoid 23A. However, the present invention is not limited thereto, and, for example, both the first switching element and the second switching element may be disposed on the downstream side of the solenoid. Both the first switching element and the second switching element may be disposed on the upstream side of the solenoid. In other words, the first switching element and the second switching element may be arranged in a manner different from the above-described example as long as they are connected to the solenoid in series.

Each of the embodiments has been described citing the example when the rear electric brake ECU 24 or 31 is mounted on the brake mechanism 22, by which these brake mechanism 22 and rear electric brake ECU 24 or 31 are configured as one unit (assembly). However, the present invention is not limited thereto, and, for example, the brake mechanism and the rear electric brake ECU may be disposed while being separated from each other. In this case, individually different electric brake ECUs (rear electric brake ECUs) may be provided for the left side (the rear left wheel side) and the right side (the rear right wheel side), respectively, or the rear electric brake ECU may be configured as one (a common) electric brake ECU (rear electric brake ECU) shared by the left side (the rear left wheel side) and the right side (the rear right wheel side).

Each of the embodiments has been described citing the example when the hydraulic brake apparatuses 4 and 4 are provided on the front wheel 3L and 3R side and the electric brake apparatuses 21 and 21 are provided on the rear wheel 5L and 5R side. However, the present invention is not limited thereto, and, for example, the electric brake apparatus and the hydraulic brake apparatus may be provided on the front wheel side and the rear wheel side, respectively.

Each of the embodiments has been described citing the example configured to include the parking mechanisms 23 in the left and right electric brake apparatuses 21 and 21 on the rear wheel side. However, the present invention is not limited thereto, and, for example, the electric brake apparatus equipped with the parking mechanism may be disposed on each of the front left wheel side and the front right wheel side. Alternatively, the electric brake apparatus equipped with the parking mechanism may be disposed on each of the four front left, front right, rear left, and rear right wheels. In other words, the vehicle may be configured in such a manner that the electric brake apparatus is disposed on each of the four front left, front right, rear left, and rear right wheels, and the parking mechanism is provided to the electric brake apparatus on each of the front left and right wheels and/or the rear left and right wheels along therewith. In sum, the electric brake apparatus on at least a pair of left and right wheels, among the wheels of the vehicle, can be formed by the electric brake apparatus equipped with the parking mechanism.

Further, each of the embodiments is only an example, and it is apparent that the configurations indicated in the different embodiments can be partially replaced or combined.

Possible configurations as the control apparatus based on the above-described embodiments include the following examples.

As a first configuration, a control apparatus includes a switching element configured to connect or shut off a power source circuit for supplying power to a solenoid, an arithmetic element configured to control actuation of the switching element, a diagnosis device configured to diagnose an abnormality in the arithmetic element, and a delay element provided between the arithmetic element and the switching element.

According to this first configuration, with the aid of the delay element, the control apparatus can delay an input of a signal from the arithmetic element to the switching element, thereby delaying the power supply to the solenoid. As a result, when an abnormality has occurred in the arithmetic element, the control apparatus can determine the abnormality in the arithmetic element by the diagnosis device and shut off the power supply to the solenoid before the switching element is brought into a connection state in reaction to the signal from the arithmetic element. Due to this effect, the control apparatus can prevent the solenoid from being erroneously driven at an unintended timing, and avoid unintended holding of the thrust force.

As a second configuration, a control apparatus includes a first switching element configured to connect or shut off a power source circuit for supplying power to a solenoid, a second switching element configured to connect or shut off the power source circuit, an arithmetic element configured to control actuation of the first switching element and the second switching element, a diagnosis device configured to diagnose an abnormality in the arithmetic element, and a delay element provided at any of a position between the arithmetic element and the first switching element or a position between the arithmetic element and the second switching element.

According to this second configuration, for example, in the case where the delay element is provided between the arithmetic element and the first switching element, the control apparatus can delay an input of a signal from the arithmetic element to the first switching element and delay the power supply to the solenoid with the aid of the delay element. As a result, when an abnormality has occurred in the arithmetic element, the control apparatus can bring the second switching element into a shut-off state by the diagnosis device before the first switching element is brought into a connection state in reaction to the signal from the arithmetic element. Due to this effect, the control apparatus can immediately shut off the power supply to the solenoid when the arithmetic element is abnormal, thereby preventing the solenoid from being erroneously driven according to the abnormality in the arithmetic element. Such an advantageous effect can also be acquired in the case where the delay element is provided between the arithmetic element and the second switching element.

According to a third configuration, in the second configuration, the power source circuit is configured to supply the power to the solenoid when the first switching element and the second switching element establish the connection of the circuit. According to this third configuration, the control apparatus can connect or shut off the power source circuit and control the driving of the solenoid with use of both the first switching element and the second switching element.

As a fourth configuration, in the first or second configuration, the diagnosis device stops the power supply from the power source circuit to the solenoid when the arithmetic element is abnormal. According to this fourth configuration, the control apparatus can avoid erroneous driving of the solenoid due to an abnormality (for example, a failure) in the arithmetic element. In other words, the control apparatus can prevent the solenoid from being erroneously driven at an unintended timing, and avoid unintended holding of the thrust force.

As a fifth configuration, in the fourth configuration, the delay element delays driving of the switching element by a time longer than a time taken to diagnose the abnormality in the arithmetic element by the diagnosis device. According to this fifth configuration, due to the above-described configuration, the control apparatus can start the control of the solenoid after determining whether the actuation state of the arithmetic element is normal or abnormal by the diagnosis device. For example, if the actuation state of the arithmetic element is determined to be abnormal by the diagnosis device, the control apparatus can shut off the power supply to the solenoid by the diagnosis device before the first switching element is switched to the connection state by the arithmetic element. As a result, the control apparatus can avoid erroneous driving of the solenoid due to a failure in the arithmetic element. In other words, the control apparatus can prevent the solenoid from being erroneously driven at an unintended timing, and avoid unintended holding of the thrust force.

As a sixth configuration, a control apparatus includes a switching element configured to connect or shut off a power source circuit for supplying power to a solenoid, an arithmetic element configured to control actuation of the switching element, and a diagnosis device configured to diagnose an abnormality in the arithmetic element. The diagnosis device is another arithmetic element. The another arithmetic element is provided between the arithmetic element and the switching element. Further, the another arithmetic element delays a signal for controlling the actuation of the switching element that is output from the arithmetic element and outputs the signal for controlling the actuation of the switching element if no abnormality is detected in the arithmetic element while the signal is delayed. Further, the another arithmetic element does not output the signal for controlling the actuation of the switching element if the abnormality is detected in the arithmetic element while the signal is delayed.

According to this sixth configuration, the control apparatus can diagnose an abnormality (the actuation state) in the arithmetic element by the diagnosis device. More specifically, the diagnosis device formed by the another arithmetic element determines whether the signal for controlling the actuation of the switching element that is output from the arithmetic element is normal or abnormal by being placed between the arithmetic element and the switching element. Therefore, the diagnosis device can determine whether to output the signal from the arithmetic element to the switching element. In other words, the diagnosis device delays the signal from the arithmetic element, and outputs the signal if no abnormality is detected in the arithmetic element while the signal is delayed. As a result, the switching element connects the power source circuit for supplying power to the solenoid. On the other hand, the diagnosis device does not output the signal if the abnormality is detected in the arithmetic element while the signal is delayed. As a result, the switching element shuts off the power source circuit for supplying power to the solenoid. Due to this configuration, the control apparatus can avoid erroneous driving of the solenoid due to an abnormality (for example, a failure) in the arithmetic element. In other words, the control apparatus can prevent the solenoid from being erroneously driven at an unintended timing, and avoid unintended holding of the thrust force.

As a seventh configuration, in the first, second, or sixth configuration, in an electric brake apparatus configured to acquire a thrust force for braking a vehicle based on driving of an electric actuator different from the solenoid, the solenoid is used to drive a thrust force holding mechanism provided for allowing the generated thrust force to be held without power supply to the solenoid and the electric actuator. According to this seventh configuration, the thrust force for braking the vehicle can be held by the driving of the solenoid for controlling the thrust force holding mechanism even with no power supplied to the solenoid and the electric actuator. Further, the present configuration can prevent the solenoid from being erroneously driven, thereby preventing the parking mechanism from being erroneously driven and avoiding unintended holding of the thrust force.

The present invention shall not be limited to the above-described embodiments, and includes various modifications. For example, the above-described embodiments have been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each of embodiments can also be implemented with another configuration added, deleted, or replaced with respect to a part of the configuration of this embodiment.

The present application claims priority under the Paris Convention to Japanese Patent Application No. 2019-080965 filed on Apr. 22, 2019. The entire disclosure of Japanese Patent Application No. 2019-080965 filed on Apr. 22, 2019 including the specification, the claims, the drawings, and the abstract is incorporated herein by reference in its entirety.

REFERENCE SIGNS LIST 1 vehicle
21 electric brake apparatus
22B electric motor (electric actuator)
23 parking mechanism (thrust force holding mechanism)
23A solenoid
24, 31 rear electric brake ECU (control apparatus)
24A arithmetic element
24C first switching element (switching element).
24D delay element
24E second switching element (switching element)
24G diagnosis device
28 power source circuit
32 arithmetic element (diagnosis apparatus).

The invention claimed is:
1. A control apparatus comprising:
a switch configured to connect or shut off a power source circuit for supplying a power to a solenoid;
a microcomputer configured to control an actuation of the switch;
a diagnosis circuit configured to diagnose an abnormality in the microcomputer; and
a delay circuit between the microcomputer and the switch, wherein:
the delay circuit is configured to delay a signal for controlling the actuation of the switch, the signal being output from the microcomputer;
the diagnosis circuit is configured to stop the supply of the power from the power source circuit to the solenoid when the abnormality in the microcomputer is diagnosed; and
the delay circuit is configured to delay the signal by a time longer than a time taken to diagnose the abnormality in the microcomputer by the diagnosis circuit.
2. The control apparatus according to claim 1, wherein the control apparatus is configured to control the solenoid to drive a thrust force holding mechanism for allowing a thrust force to be held without the supply of the power to the solenoid, the solenoid being in an electric brake apparatus configured to generate the thrust force for braking a vehicle based on driving of an electric actuator different from the solenoid.
3. A control apparatus comprising:
a first switch configured to connect or shut off a power source circuit for supplying a power to a solenoid;
a second switch configured to connect or shut off the power source circuit;
a microcomputer configured to control an actuation of the first switch and an actuation of the second switch;
a diagnosis circuit configured to diagnose an abnormality in the microcomputer; and
a delay circuit at any of a first position between the microcomputer and the first switch or a second position between the microcomputer and the second switch, wherein:
the delay circuit is configured to delay a signal for controlling the actuation of the first switch or the actuation of the second switch, the signal being output from the microcomputer;

the diagnosis circuit is configured to stop the supply of the power from the power source circuit to the solenoid when the abnormality in the microcomputer is diagnosed; and the delay circuit is configured to delay the signal by a time longer than a time taken to diagnose the abnormality in the microcomputer by the diagnosis circuit.

4. The control apparatus according to claim 3, wherein the power source circuit is configured to supply the power to the solenoid when the first switch and the second switch are brought into connection.

5. The control apparatus according to claim 3, wherein the control apparatus is configured to control the solenoid to drive a thrust force holding mechanism for allowing a thrust force to be held without the supply of the power to the solenoid, the solenoid being in an electric brake apparatus configured to generate the thrust force for braking a vehicle based on driving of an electric actuator different from the solenoid.

6. A control apparatus comprising:
a switch configured to connect or shut off a power source circuit for supplying a power to a solenoid;
a first microcomputer configured to control an actuation of the switch; and
a diagnosis circuit configured to diagnose an abnormality in the first microcomputer, wherein:
the diagnosis circuit is a second microcomputer;
the second microcomputer is between the first microcomputer and the switch;
the second microcomputer is configured: (i) to delay a signal for controlling the actuation of the switch, the signal being output from the first microcomputer; (ii) to output the signal if no abnormality in the first microcomputer is diagnosed while the signal is delayed; (iii) not to output the signal if the abnormality in the first microcomputer is diagnosed while the signal is delayed; (iv) to stop the supply of the power from the power source circuit to the solenoid when the abnormality in the first microcomputer is diagnosed; and (v) to delay the signal by a time longer than a time taken to diagnose the abnormality in the first microcomputer by the diagnosis circuit.

7. The control apparatus according to claim 6, wherein the control apparatus is configured to control the solenoid to drive a thrust force holding mechanism for allowing a thrust force to be held without the supply of the power to the solenoid, the solenoid being in an electric brake apparatus configured to generate the thrust force for braking a vehicle based on driving of an electric actuator different from the solenoid.

* * * * *